June 5, 1962 J. MATARESE 3,038,080
PHOTOLUMINESCENT LOGIC CIRCUIT FOR SELECTIVELY ENERGIZING PLURAL OUTPUT LINES IN RESPONSE TO INPUT VOLTAGE LEVEL
Filed March 14, 1960
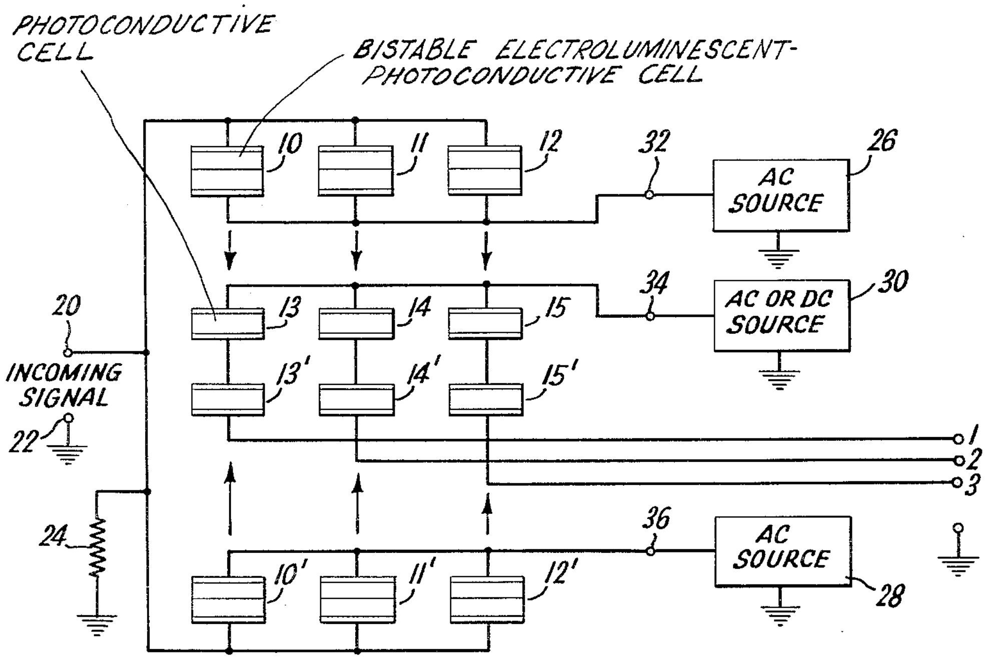
INVENTOR
JOHN MATARESE
BY Theodore Jay Jr.
ATTORNEY United States Patent Office 3,038,080

Patented June 5, 1962

3,038,080

PHOTOLUMINESCENT LOGIC CIRCUIT FOR SELECTIVELY ENERGIZING PLURAL OUTPUT LINES IN RESPONSE TO INPUT VOLTAGE LEVEL

John Matarese, Bronx, N.Y., assignor to General Telephone & Electronics Laboratories Inc., a corporation of Delaware Filed Mar. 14, 1960, Ser. No. 14,934
8 Claims. (Cl. 250—208)

My invention is directed to electronic switches.

One type of electronic switch, widely used in the electronic field, responds to an incoming signal which attains any one of N different discrete values to produce an output signal at any one of N different output electrodes, the particular electrode at which the output signal appears being selected in accordance with the value of the incoming signal.

I have invented a new electronic switch of this type in which the output signal produced at any selected output electrode is represented by a change in impedance level at this electrode. My switch employs bistable electroluminescent-photoconductive cells and separate photoconductive elements rather than the conventional circuit components such as tubes or transistors. It can be easily constructed at low cost and is readily adaptable to various circuit applications.

A bistable electroluminescent-photoconductive cell, as employed in my invention, is a sandwich type structure consisting of separate electroluminescent and photoconductive layers placed one above the other and electrically connected in series between first and second electrodes. When the photoconductive layer is in the dark, its impedance is high relative to that of the electroluminescent layer. When the electroluminescent layer emits light, however, a portion of this light impinges upon the photoconductive layer; the impedance of the photoconductive layer is then sharply reduced to a value much lower than that of the electroluminescent layer.

When a voltage is first applied between the two electrodes, and the value of this voltage falls below a critical value (i.e. the trigger voltage), the voltage drop across the electroluminescent layer is insufficient to produce light, and the cell is in its first or unexcited state. However, should the value of this voltage equal or exceed the trigger voltage, some light will be emitted from the electroluminescent layer. Due to the optical coupling between the electroluminescent and photoconductive layers, the impedance of the photoconductive layer is quickly reduced; the voltage drop across the electroluminescent layer increases sharply; and the intensity of the light emitted from the electroluminescent layer increases to a maximum value. The cell is then in its second or excited state. When the cell is in its second state, the applied voltage can be reduced from the trigger value to a lower value (the cut-off voltage) and the electroluminescent layer will continue to emit light. As the voltage drops below the cut-off value, however, the light output from the electroluminescent layer decreases; the impedance of the photoconductive layer increases sharply; and the cell returns to its unexcited state.

In accordance with the principles of my invention, I provide first and second groups of bistable electroluminescent-photoconductive cells, each group containing N different cells.

The first group of cells are connected in parallel between first and second terminals. The second group of cells are connected in parallel between the first terminal and a third terminal.

A first power supply is coupled between the second terminal and a fifth terminal, and a second power supply is coupled between the third terminal and the fifth terminal. An input circuit is coupled between the first and fifth terminals.

I further provide first and second sets of photoconductive elements, each set containing N different elements. Each first set element is optically coupled to a corresponding first group cell. Each second set element is optically coupled to a corresponding second group cell. Further, each first set element is connected in series with a corresponding second set element to form N different series connected element pairs. One end of each of these element pairs is connected to a fourth terminal.

Further, I provide N different output electrodes, each element being connected to the other end of a corresponding element pair.

The trigger and cut-off voltages required for bistable operation of each of the first, second . . . Nth cells of the first group differ one from another and increase in steps so that a pair of trigger and cut-off voltages of different values is associated with each first group cell. The particular voltage pair associated with a corresponding one of the first, second . . . Nth cells of the first group is also associated with a corresponding one of the Nth (N–1) . . . first cell of the second group. The voltage difference V between the cut-off and trigger voltages is the same for all voltage pairs.

In order to operate the above described invention, an incoming signal having one of N different discrete voltage values, V, 2V, . . . NV is applied to the input circuit. The first power supply applies to the first group of cells a first voltage having a value which does not exceed the minimum cut-off voltage of any of the voltage pairs. The second power supply applies to the second group of cells a second voltage having a value which is at least equal to the maximum trigger voltage of any of the voltage pairs. The first and second voltages are opposed in sense, the incoming signal being in opposite sense to the second voltage.

In the absence of the incoming signal, all second group cells are excited and all first group cells are unexcited. Consequently, all second set elements represent low impedances and all first set elements represent high impedances. The net result is that the impedance of each output electrode, as measured between this electrode and the fourth terminal, has a high value.

When the incoming signal has a value of V, the second group cells remain energized, but in addition the first cell in the first group is energized. Then the first element in the first set represents a low impedance. Since all second set elements represent low impedances, the impedance at the first output electrode then falls to a low value, while the impedance at all other output electrodes remains high.

As will become more apparent hereinafter, as the value of the incoming signal changes, the impedance of the particular output electrode associated with the instantaneous value of the incoming signal will fall to a low value while the impedance at all other output electrodes remains high, thus providing the desired switching action.

An illustrative embodiment of my invention will now be described with reference to the accompanying drawing.

Referring to the drawing, there is shown a first set of bistable electroluminescent-photoconductive cells 10, 11, and 12 coupled in parallel between an input terminal 20 and the output terminal 32 of a grounded power supply 26. (These bistable cells are of known construction as shown for example in the following U.S. Patents 2,915,641, 2,650,310, 2,768,310, 2,839,690, 2,858,363.) A second group of three bistable electroluminescent-photoconductive cells 10', 11', and 12' are also connected in parallel between the input terminal 20 and the output terminal 36 of a second grounded power supply 28. Cells 10 and 12' have a cut-off voltage of 100 volts and a trigger voltage of 110 volts. Cells 11 and 11' have a cut-off voltage of 110 volts and a trigger voltage of 120 volts. Cells 12 and 10' have a cut-off voltage of 120 volts and a trigger voltage of 130 volts. Thus, the difference between the trigger and the cut-off voltages is always the same, 10 volts.

The first power supply 26 supplies to the first group of cells a voltage of 100 volts. The second power supply 12 supplies a voltage of 140 volts to the second group of cells, the voltages supplied from the first and second power supplies being in phase opposition.

I further provide a first set of photoconductive elements 13, 14 and 15 which are optically coupled to the corresponding cells 10, 11 and 12. In addition there is provided a second set of photoconductive elements 13', 14' and 15', each of which is optically coupled to a corresponding cell 10', 11' and 12'. The corresponding first and second elements are connected in series between corresponding output electrodes 1, 2 and 3 and a common terminal 34. Terminal 34 can be coupled to either of the terminals 32 and 36. Alternatively, as shown in the FIGURE, terminal 34 can be the output of a grounded A.C. or D.C. power supply 30.

In the absence of any signal at the input terminal, cells 10', 11' and 12' are energized and illuminate corresponding elements 13', 14' and 15' which are then low impedances. The first group of cells are all unexcited and the corresponding elements 13, 14 and 15 are high impedances.

In the presence of an incoming signal of 10 volts A.C. (this voltage is in phase opposition to the voltage supplied from the second power supply), cell 10 is excited and cells 11 and 12 remain unexcited. Consequently, the impedance at electrode 1 drops to a low value, while the impedances of electrodes 2 and 3 remain at high values. When the incoming signal changes to 20 volts, cells 10, 11, 11' and 12' are excited, while cells 12 and 10' are unexcited. Consequently, the impedance at electrode 2 drops to a low value while the impedances at electrodes 1 and 3 remain at high values. Finally, when the incoming signal changes to 30 volts, cells 10, 11, 12 and 12' are excited, while cells 10' and 11' remain unexcited. Consequently, the impedance at the electrode 3 changes to a low value, while the impedances at electrodes 1 and 2 remain high.

For a given voltage, the voltage gradients established within any bistable cell are determined by the thickness of the cell. It is these voltage gradients which determine whether or not a cell is excited. Consequently, one method of constructing the bistable cells to respond to different cut-off and trigger voltages is to slightly vary the thickness of various cells. Thus, cells 10 and 12' can have the same thickness; cells 11 and 11', while equal in thickness, can be slightly thicker than cells 10 and 12'; cells 12 and 10', while equal in thickness, can be slightly thicker than cells 11 and 11'. Alternatively, for example, the composition of the various electroluminescent and photoconductive layers can be varied somewhat to produce cells which have the same thickness but have slightly different electrical characteristics.

Resistor 24 has a value which is low as compared to the impedance of the bistable cells. The circuit of the FIGURE will function properly in the absence of resistor 24, but resistor 24, when present, will protect sources 26 and 28 from damage should a bistable cell become short circuited.

What is claimed is:

1. A device comprising first and second groups of bistable electroluminescent-photoconductive cells, each group containing N different cells, the first group of cells being connected in parallel between first and second terminals, the second group of cells being connected in parallel between said first terminal and a third terminal, the trigger and cut-off voltages required for bistable operation of each of the first, second . . . Nth cells of the first group differing one from another and increasing in steps whereby a pair of trigger and cut-off voltages of different values is associated with each first group cell, the particular voltage pair associated with a corresponding one of the first, second . . . Nth cell of the first group also being associated with a corresponding one of the Nth (N–1), . . . first cell of the second group, the voltage difference B between the trigger and cut-off voltages being the same for all voltage pairs; first and second sets of photoconductor elements, each set containing N different elements, each first set element being connected in series with a corresponding second set element to form N different series connected element pairs, one end of each of said pairs being connected to a fourth terminal; each first set element being optically coupled to a corresponding first group cell, each second set element being optically coupled to a corresponding second group cell; and N different output electrodes, each electrode being connected to the other end of a corresponding element pair.

2. A device comprising first and second groups of bistable electroluminescent-photoconductive cells, each group containing N different cells, the first group of cells being connected in parallel between first and second terminals, the second group of cells being connected in parallel between said first terminal and a third terminal, the trigger and cut-off voltages required for bistable operation of each of the first, second, . . . Nth cells of the first group differing one from another and increasing in steps whereby a pair of trigger and cut-off voltages of different values is associated with each first group cell, the particular voltage pair associated with a corresponding one of the first, second, . . . Nth cell of the first group also being associated with a corresponding one of the Nth (N–1), . . . first cell of the second group, the voltage difference V between the trigger and cut-off voltages being the same for all voltage pairs; first and second sets of photoconductor elements, each set containing N different elements, each first set element being connected in series with a corresponding second set element to form N different series connected element pairs, one end of each of said pairs being connected to a fourth terminal, each first set element being optically coupled to a corresponding first group cell, each second set element being optically coupled to a corresponding second group cell; N different output electrodes, each electrode being connected to the other end of a corresponding element pair; a first power supply coupled between said second terminal and a fifth terminal; a second power supply coupled between said third and fifth terminals; and an input circuit coupled between said first and fifth terminals.

3. A device comprising first and second groups of bistable electroluminescent-photoconductive cells, each group containing N different cells, the first group of cells being connected in parallel between first and second terminals, the second group of cells being connected in parallel between said first terminal and a third terminal, the trigger and cut-off voltages required for bistable operation of each of the first, second, . . . Nth cells of the first group differing one from another and increasing in steps whereby a pair of trigger and cut-off voltages of different values is associated with each first group cell, the particular voltage pair associated with a corresponding one of the first, second, . . . Nth cell of the first group also being associated with a corresponding one of the Nth (N–1), . . . first cell of the second group, the voltage difference V between the trigger and cut-off voltages being the same for all voltage pairs; first and second sets of photoconductor elements, each set containing N different elements, each first set element being connected in series with a corresponding second set element to form N different series connected element pairs, one end of each of said pairs being connected to a fourth terminal, each first set element being optically coupled to a corresponding first group cell, each second set element being optically coupled to a corresponding second group cell; N different output electrodes, each electrode being connected to the other end of a corresponding element pair; a first power supply coupled between said second terminal and a fifth terminal to supply to said first group of cells a first voltage having a value which does not exceed the minimum cut-off voltage of said voltage pairs; and a second power supply coupled between said third and fifth terminals to supply to said second group of cells a second voltage having a value which is at least equal to the maximum trigger voltage of said voltage pairs, said first and second voltages being opposed in sense.

4. A device comprising first and second groups of bistable electroluminescent-photoconductive cells, each group containing N different cells, the first group of cells being connected in parallel between first and second terminals, the second group of cells being connected in parallel between said first terminal and a third terminal, the trigger and cut-off voltages required for bistable operation of each of the first, second, . . . Nth cells of the first group differing one from another and increasing in steps whereby a pair of trigger and cut-off voltages of different values is associated with each first group cell, the particular voltage pair associated with a corresponding one of the first, second, . . . Nth cell of the first group also being associated with a corresponding one of the Nth (N–1), . . . first cell of the second group, the voltage difference V between the trigger and cut-off voltages being the same for all voltage pairs; first and second sets of photoconductor elements, each set containing N different elements, each first set element being connected in series with a corresponding second set element to form N different series connected element pairs, one end of each of said pairs being connected to a fourth terminal, each first set element being optically coupled to a corresponding first group cell, each second set element being optically coupled to a corresponding second group cell; N different output electrodes, each electrode being connected to the other end of a corresponding element pair; a first power supply coupled between said second terminal and a fifth terminal to supply to said first group of cells a first voltage having a value which does not exceed the minimum cut-off voltage of said voltage pairs; a second power supply coupled between said third and fifth terminals to supply to said second group of cells a second voltage having a value which is at least equal to the maximum trigger voltage of said voltage pairs, said first and second voltages being opposed in sense; an input circuit coupled between said first and fifth terminals and means to supply to said input circuit an incoming signal having one of N different discrete voltage values, V, 2V, . . . NV, said signal being in opposite sense to said second voltage.

5. A device comprising first and second groups of bistable electroluminescent-photoconductive cells, each group containing N different cells, the first group of cells being connected in parallel between first and second terminals, the second group of cells being connected in parallel between said first terminal and a third terminal, the trigger and cut-off voltages required for bistable operation of each of the first, second, . . . Nth cells of the first group differing one from another and increasing in steps whereby a pair of trigger and cut-off voltages of different values is associated with each first group cell, the particular voltage pair associated with a corresponding one of the first, second, . . . Nth cell of the first group also being associated with a corresponding one of the Nth (N–1), . . . first cell of the second group, the voltage difference V between the trigger and cut-off voltages being the same for all voltage pairs; first and second sets of photoconductor elements, each set containing N different elements, each first set element being connected in series with a corresponding second set element to form N different series connected element pairs, one end of each of said pairs being connected to a fourth terminal, each first set element being optically coupled to a corresponding first group cell, each second set element being optically coupled to a corresponding second group cell; N different output electrodes, each electrode being connected to the other end of a corresponding element pair; a first power supply coupled between said second terminal and a fifth terminal to supply to said first group of cells a first voltage having a value which does not exceed the minimum cut-off voltage of said voltage pairs; a second power supply coupled between said third and fifth terminals to supply to said second group of cells a second voltage having a value which is at least equal to the maximum trigger voltage of said voltage pairs; said first and second voltages being opposed in sense; an input circuit coupled between said first and fifth terminals; and means to supply to said input circuit an incoming signal having one of N different discrete voltage values V, 2V, . . . NV, said signal being in opposite sense to said second voltage, whereby each output electrode is associated with a corresponding value of said signal, all element pairs being high impedances in the absence of an incoming signal, the element pair coupled to any selected output electrode being a low impedance when the incoming signal attains a value corresponding to said selected electrode.

6. A device as set forth in claim 5 wherein said first and second supplies produce alternating voltages of opposite phase and wherein said incoming signal is an alternating voltage in phase opposition to said second voltage.

7. A device as set forth in claim 5 wherein said fourth terminal is connected to one of said second and third terminals.

8. A device as set forth in claim 5 including an additional power supply coupled between said fourth and fifth terminals.

References Cited in the file of this patent

UNITED STATES PATENTS

| | | |
|---|---|---|
| 2,895,054 | Loebner | July 14, 1959 |
| 2,900,522 | Reis | Aug. 18, 1959 |
| 2,904,696 | Elliott et al. | Sept. 15, 1959 |
| 2,949,538 | Tomlinson | Aug. 16, 1960 |